(12) United States Patent  
Nayyer

(10) Patent No.: US 6,711,323 B1  
(45) Date of Patent: Mar. 23, 2004

(54) WIDE DEFLECTION-ANGLE OPTICAL SWITCHES AND METHOD OF FABRICATION

(76) Inventor: Jamshid Nayyer, 7584 Old Madison Pike, Apt. 910, Huntsville, AL (US) 35806

( * ) Notice: Subject to any disclaimer, the term of this patent is extended or adjusted under 35 U.S.C. 154(b) by 2 days.

(21) Appl. No.: 10/356,448

(22) Filed: Jan. 31, 2003

Related U.S. Application Data

(60) Provisional application No. 60/370,742, filed on Apr. 8, 2002.

(51) Int. Cl.$^7$ ................................................. G02B 6/42

(52) U.S. Cl. ......................................... 385/22; 385/16

(58) Field of Search ........................ 385/16, 18, 20–23

(56) References Cited

U.S. PATENT DOCUMENTS 6,192,171 B1 * 2/2001 Goodman et al. ............ 385/16  
6,320,999 B1 * 11/2001 Pouteau et al. ............... 385/23

FOREIGN PATENT DOCUMENTS

JP     P3193427     5/2001

OTHER PUBLICATIONS

K. Komatsu, K. Hamamoto, H. Sugimoto, A. Ajisawa, Y. Kohga and A. Suzuki, "4=4 GaAs/GmAiAs optical matrix switches with uniform device characteristics using alternating Δ B electrooptic guided wave directional couplers," Journal of Lightwave Technology, vol. 9, No. 7, pp 871–878, Jul. 1991.

H. Yamamoto, M. Asada and Y. Suematou, "Theory of refractive index variation in quantum well structure and related intersectional optical switch," Journal of Lightwave Technology, vol. 6, No. 12, pp 1831–1840, Dec. 1988.

J. Nayyer, Y. Suematsu and K. Shimomura, "Analysis of reflection type optical switches with intersecting waveguides," Journal of Lightwave Technology, vol. 6, No. 6, pp 1146–1152, Jun. 1988.

J. Nayyer and Hamid Hatami–Hanza, "Optical intersecting waveguide switches with widened angle of deflection," IEEE Photonics Technology Letters, vol. 4, No. 12, pp 1375–1377, Dec. 1994.

J. Nayyer, H. Hatami–Hanza and S. Safari–Naeini, "Optical intersecting waveguide switches with curved electrodes," IEICE Transactions on Electronics, vol. E–72, pp 69–76, Jan. 1994.

H. Hatami–Hanza, J. Nayyer and S. Satani–Naeins,"Extinction ratios and scattering losses of optical intersecting waveguide switches with curved electrodes," Journal of Lightwave Technology, vol. 12, pp 1475–1481, Aug. 1994.

B. Li and S.J. Chua, "Reflection type optical waveguide switch with low–tie electrode," Journal of Lightwave Technology, vol. 20, No. 1, pp 65–70, Jan. 2002.

(List continued on next page.)

Primary Examiner—Ellen E. Kim  
(74) Attorney, Agent, or Firm—Mark Clodfelter

(57) ABSTRACT

An optical spatial switch with perpendicular states and capability of high-speed operation in the range of about 100 Gb/sec is provided. The switch is made of n-i-p semiconductor waveguides of, for example, GaInAs/InP for operation at 1.55 $\mu$m wavelength or PbTe for operation at 3.39 $\mu$m in the form of multiquantum wells grown with a boundary plane with air formed as an exponential spiral. The waveguide claddings may be of n and p doped layers, with the core of i-type quantum wells separated by barriers. The waveguides of ports of incidence and reflection are made to be at critical (Brewester) angle of semiconductor/air interface for the case of decreasing (or increasing) refractive index due to the application of voltage and the port of transmission waveguide in the form of, for example an optical fiber, brought close to the boundary and aligned at the Brewester angle in the air. The hot and ground electrodes are made so that their edges are aligned to the curved semiconductor/air boundary.

20 Claims, 17 Drawing Sheets

OTHER PUBLICATIONS

K. Niayesh, J. Nayyer, A. Shoeshtari and S. Sefani–Naesini, "Speed increase of optical switch/modulators by intersecting curved electrodes," in Technical Digest of Second Optoelectronics and Communications Conference (OECC '97), Jul. 8–11, 1997, papers 8B2–4, pp 36–37.

T.H. Wood, R.W. Trach and A.R. Charaplyvy, "Observation of large quadratic electro–optic effect in GeAs/AlGaAs multiple quantum wells," Applied Physics Letters, vol. 50, pp 798–800, Mar. 1987.

T. Aizawa, K. Shimomura, S. Arai and Y. Suematsu, Observation of field induced refractive index variation in quantum box structure, IEEE Photonics Technology Letters, vol. 3, pp 907–909, Oct. 1991.

K.G. Ravikumar, T. Aizawa, K. Matsubara and Y. Suematsu, "Analysis of electric field effect in quantum box structure and its application to low loss intersectional type optical switch," Journal of Lightwave Technology, vol. 9, pp 1376–1385, Oct. 1991.

H. Feng, J.P. Pang, M. Sugiyama, K. Tada and Y. Nakano, "Field induced optical effect in a Five–step asymmetric coupled quantum well with modified potential," IEEE Journal of quantum electronics, vol. 34, No. 7, pp 1197–1208, Jul. 1998.

K. Shimomura, Y. Suematsu and S. Arai, "Analysis of semiconductor intersectional waveguide optical switch–modulator," IEEE Journal of quantum electronics, vol. 26, No. 5, pp 883–892, May 1990.

J. Nayyer, K. Niayesh and S. Safari Naeini, "Application of slightly curved exponential interfaces in chirp reduction of opto–electronic devices and integrated circuits," in Technical Digest of First Optoelectronics and Communications Conference (OECC '96), Jul. 16–19, 1996, paper 18P–21, pp 462–463.

* cited by examiner-

WIDE DEFLECTION-ANGLE OPTICAL SWITCHES AND METHOD OF FABRICATION

CROSS REFERENCE TO RELATED APPLICATIONS

This application claims the benefit of provisional application number 60/370,742, filed Apr. 8, 2002.

FIELD OF THE INVENTION

This invention relates to a high speed spatial light switch, and particularly to a light switch having a short internal light path due to a light input port and a light reflection port being at critical angles close to normal to a switching boundary plane, and wherein operation is based on refractive index changes of electrooptic materials, for example semiconductors incorporating quantum well films, rods or dots.

BACKGROUND OF THE INVENTION

Optical communication systems having bandwidths of about 10 Gigabits/second (Gb/sec) have been implemented on several thousand kilometer long transoceanic routes, and in the future are expected to operate at about 100 Gb/sec. Switches and modulators are important devices needed in such optical high-speed communication systems. Such devices must be capable of high extinction ratio performance, be small in size, monolithically integrable into integrated circuits and components, fast, have low drive requirements, low loss and be reliable. At present, 10 Gb/sec optical modulators are available, and 40 Gb/sec modulators will soon be or already are available to the market. However, high speed spatial switches that operate in the 10 Gb/sec range do not currently exist, with this switching function currently being performed at slower speeds electronically. Such switching operations are tedious, and two domain transforms (from optical to electronics and from electronics back to optical) are required. There is, therefore, a need for optical spatial switches capable of performing at speeds (in the 100 Gb/sec range) used in newly emerging high speed optical communication systems.

Optical spatial switching can be realized in directional couplers, intersecting (or X type) and branching (or Y type) waveguide structures. In the case of directional couplers, currently available devices are 1 mm or even larger in size, and fabrication accuracy is stringent (1). In the intersecting waveguides where the switching mechanism is based on Total Internal Reflection (TIR), small size and monolithically integrated devices may be realized using semiconductor-type electrooptic materials where refractive index changes of quantum well structures are 1 to 2 orders of magnitude larger than those in bulk materials (2, 3). One problem with these TIR-type switches is poor extinction ratios due to light leakage between ON/OFF states as a consequence of a small angle of intersection (FIGS. 8, 9). The structure of TIR-type switches has been improved by invention of curved and bow-tie electrodes, resulting in better extinction ratios and widened angles of intersection (4, 5, 6, 7). Although such improvements have been experimentally confirmed, there are still problems of high absorption losses caused by unavoidable absorption-increase associated with refractive index changes and necessity for light incidence at grazing angles (8). Since angle of intersection is determined by critical angle, the grazing angle of incidence results in a long light path in the semiconductor switch under voltage-induced absorption losses. The above-mentioned difficulties are serious impediments to realization of high quality optical spatial switches.

In accordance with the foregoing, objects of the invention are directed to overcoming the above-mentioned difficulties. Accordingly, light switching is accomplished in the instant invention by total reflection and transmission of guided modes at a boundary plane of two media of refractive indices $n_1(t)$ and $n_2$. In the case of a very high-speed switch, $n_1(t)$ is chosen to be a refractive index of a multiquantum well semiconductor material that can be changed very rapidly responsive to application of or removal of an electric field. Therefore, switches of the instant invention comprise optical waveguides fabricated of compound semiconductor materials (e.g. GaInAs/InP for operation at 1.55 $\mu$m wavelength or PbTe for operation at 3.39 $\mu$m wavelength). Waveguide claddings are fabricated of n- and p-doped semiconductors, and i-type quantum wells are separated by semiconductor barriers. The semiconductor material $n_1(t)$ is adjacent to the material of refractive index $n_2$ (air for example), with its boundary plane curved to form an exponential spiral (FIGS. 1($a$), 1($b$)). Port of incidence and reflection waveguides are positioned at angles equal to or very nearly equal to a critical or Brewster angle for decreasing or increasing refractive index, respectively, as a result of voltage application. A port of transmission waveguide 3 (FIG. 1($b$)) may, for example, be an optical fiber, and positioned at the Brewster angle in material of $n_2$ to collect light transmitted into $n_2$.

Electrodes across which a voltage is applied to the semiconductor material $n/_1(t)$ in order to effect change of the refractive index thereof are constructed having edges configured to the curved semiconductor boundary, i.e. the electrode edges are also curved to form an exponential spiral. These electrodes are provided on top and bottom of the device, and a uniformly applied electric field provides a corresponding uniform change of refractive index of the electrooptic material. Other advantages and objects of the invention will become clear upon a reading of the following specification.

BRIEF DESCRIPTION OF THE DRAWINGS

FIG. 1($b$) is a sectional view taken along lines 1$b$—1$b$ of FIG. 1($a$).

FIG. 1($c$) is a sectional view taken along lines 1$c$—1$c$ of FIG. 1($a$).

FIG. 11($b$) shows an extinction ratio of a transmission state $\Xi_t$ of a switch of the present invention versus index-loss variation ratio $\alpha_p$ and a fundamental absorption coefficient $\gamma$ as the parameter.

DETAILED DESCRIPTION OF THE DRAWINGS

Figure 1A:
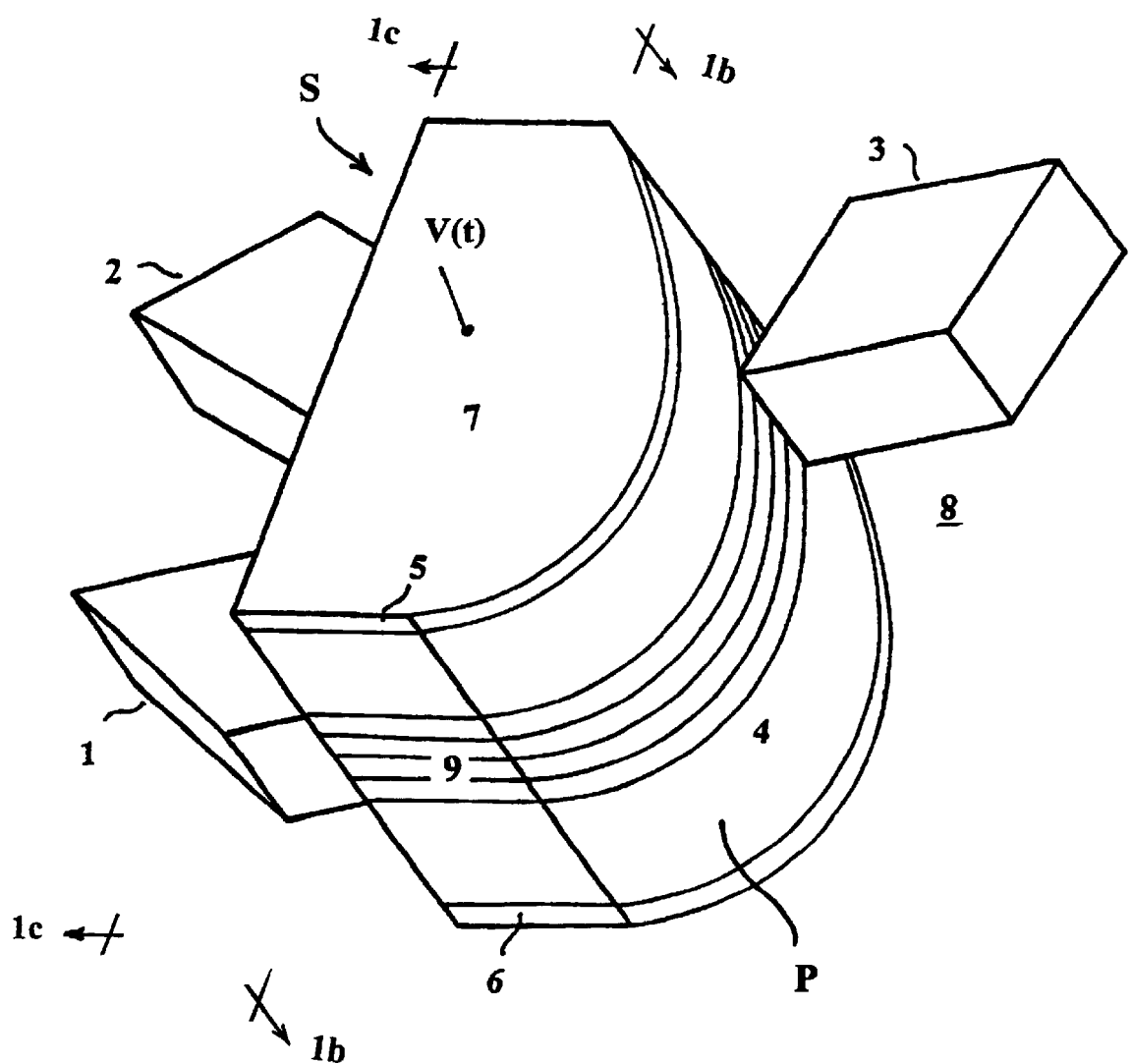
FIG. 1($a$) illustrates an overall perspective view of one embodiment of an optical spatial switch of the present invention.

With reference to FIG. 1($a$) and particularly FIG. 1($b$), there is shown a top view of one embodiment of a switch S of the present invention. A port of incidence waveguide 1, which is a light input port, and a port of reflection waveguide 2 (an output port) are incorporated into switch S, while a port of transmission 3 (the other output port) is positioned exterior to switch S to receive transmitted light when switch S is in a transmission state. As stated, port 3 may be an optical fiber in a medium different from that of switch S, such as air, or other optical material. The source of light input to the port of incidence 1 may be, for example, from an optical fiber or a laser diode, both of which may be information-carrying digital or analog signals. In the instance where a laser diode is used as a light source, such a diode may be incorporated on the same chip as the optical integrated source-switch of the instant invention. Further, arrays of such light switches of the instant invention may be integrated and fabricated on the same chip, with waveguides channeling light to and from the integrated array.

Switch S and the ports 1, 2 and 3 may be fabricated using a method for semiconductor integrated circuit fabrication wherein multiquantum well layers, insulation barriers and doped waveguide claddings are deposited in layers on a substrate, and etched or otherwise cut or deposited in patterns to form the various parts of the chip, as should be obvious to one skilled in the art. With fabrication methods available today, resolution of quantum well layers having thicknesses on the order of a few tens of Angstroms is possible. In general, a switch of the instant invention may have a curved boundary plane P at least 2 or 3 wavelengths of light or more in thickness in the waveguide core 9, and by way of example, a few hundred micrometers in length. A portion 9 of boundary plane P comprises quantum well layers each separated by a barrier, with the layers of quantum well material and barrier material being disposed perpendicular to the boundary plane P, as shown in FIG. 1($a$).

Initially, ports 1 and 2 (FIG. 1($b$)) are at a critical or Brewster angle $\alpha$ in case of a decreasing or increasing refractive index semiconductor material 7, respectively, with respect to a line normal (designated NORMAL in FIG. 1($b$)) to an exponentially curved semiconductor/air boundary plane P. It is to be appreciated that this "boundary" is configured as a plane extending across the switch and which is build up in layers as described above. The port of transmission waveguide 3 is inclined at the Brewster angle $\alpha'$ (in the air), making it perpendicular to the port of reflection waveguide 2. Curvature of the semiconductor/air boundary is configured such that it poses a constant angle of incidence $\theta=\pi/2-\alpha$ to all variously oriented plane wave components of the guided mode (FIG. 14) originated from origin O, as described in reference (6). In a reflection state (with no applied voltage, and thus in the absence of an electric field in semiconductor material 7), a guided mode of transverse magnetic (TM) polarization arriving at port of incidence waveguide 1 is totally reflected at the semiconductor/air boundary plane P and emerges from the port of reflection waveguide 2. This is the Reflection State of switch S. When a voltage is applied between terminals 5, 6 (FIG. 1($c$)), developing an electric field in multiquantum wells 9, the refractive index of the semiconductor material is decreased and the incident mode of TM polarization is totally transmitted into waveguide 3, because the angle of incidence $\alpha$ corresponds to Brewster's angle. As such, an axis of waveguide 3 should be aligned with a Brewster angle in air. This is a Transmission State of switch S. In the case of semiconductors of increasing refractive index with applied voltage, these states are reversed in that under no applied voltage, the switch is in a Transmission State, and under applied voltage the switch is in a Reflection State.

While the embodiment described above is disclosed as being fabricated of a semiconductor material having a refractive index that is varied by application of an electric field, this being the fastest embodiment of the instant invention and capable of switching operations in less than a pico second, a switch of the instant invention may be fabricated of different materials that operate slower. For instance, where switch S is fabricated of a material whose refractive index changes with current flow (carrier injection) switching allows operations in the 10~100 Mb/sec range. Likewise, a switch of the instant invention may be fabricated of a thermooptic material to which heat is applied to effect switching, which may provide switching speed on the order of 100 microsecond or so. The material of switch S may also be mechanically replaced to effect switching, which would take possibly 10 seconds or even longer. Other examples of such stimulus may be materials sensitive to visible or invisible light. Thus, any optical material may be used that has the characteristic of altering its refractive index responsive to applied stimulus.

In the embodiment switched by application-of an electric field, and as stated, since the process of refractive index change inside the semiconductor material is very rapid, light switching between the two perpendicular waveguides 2 and 3 is very fast. There is a finite delay for refractive index change to settle, this delay being less than 0.1 pico seconds, thus allowing very fast operating speeds. In addition to the above settling delay, capacitance of the device imposes a limit to the speed of operation. Here, curved boundary lengths on the order of about a few hundred micrometers should be sufficient to provide high quality reflection and transmission. Therefore, the required electrode area is small, resulting in small capacitance, and operation speeds in excess of 100 Gb/sec are believed attainable (9).

A cross section of switch S along lines 1$b$—1$b$ of FIG. 1($a$) is shown in FIG. 1($b$). Here, a body S and ports 1 and 2 of the switch are constructed of quantum well structures, such as quantum well films, rods or dots, but extension portions 1$a$ and 2$a$ of ports 1 and 2 are not in quantum well form. The semiconductor material of switch S and waveguides 1 and 2 may be constructed of, for example, GaInAs for operation at 1.55 μm wavelength, or PbTe for operation at 3.39 μm wavelength. Such structures may be grown by well-known OrganoMetallic Vapor Phase Epitaxy techniques.

Figure 1B:
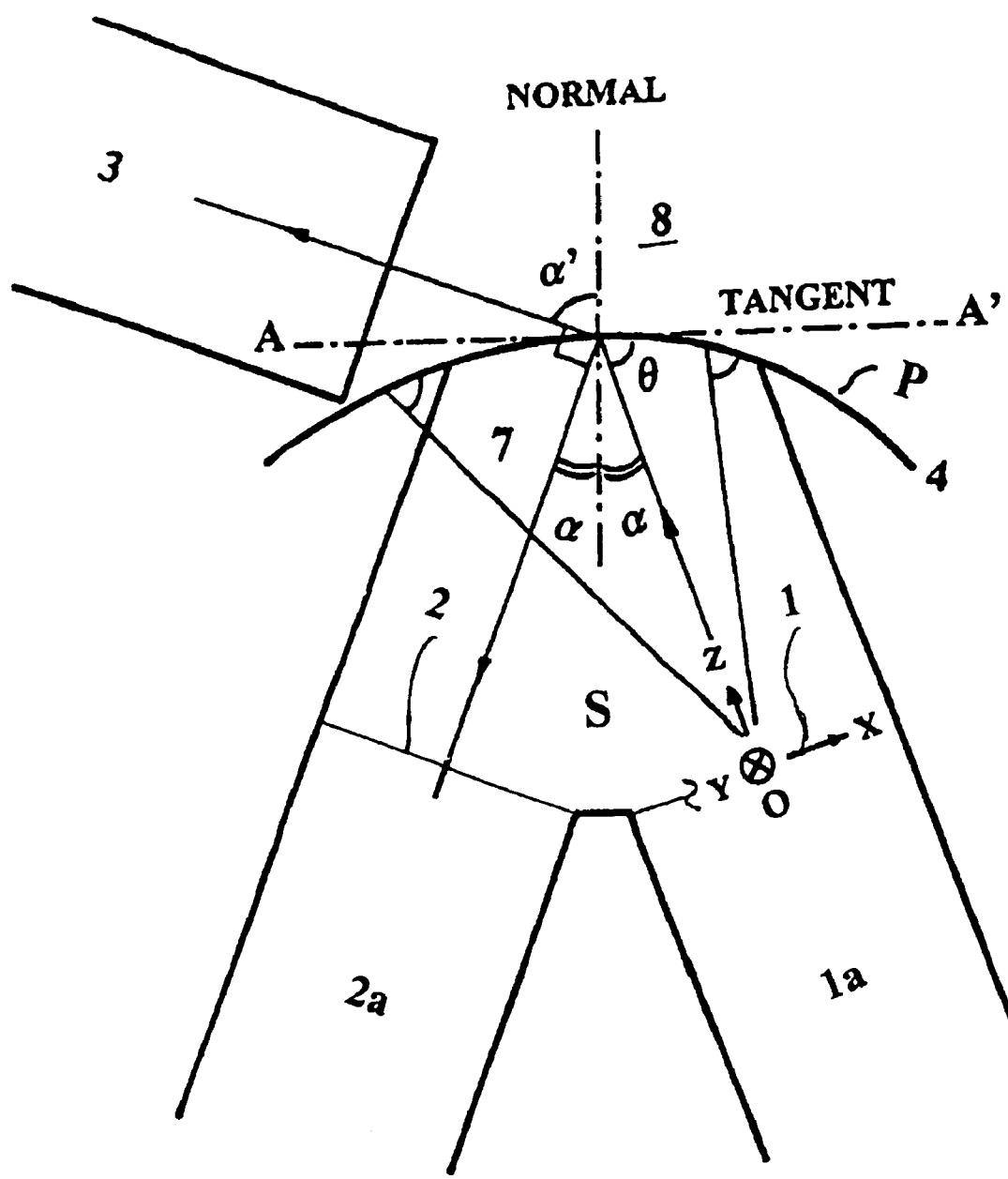
Figure 1C:
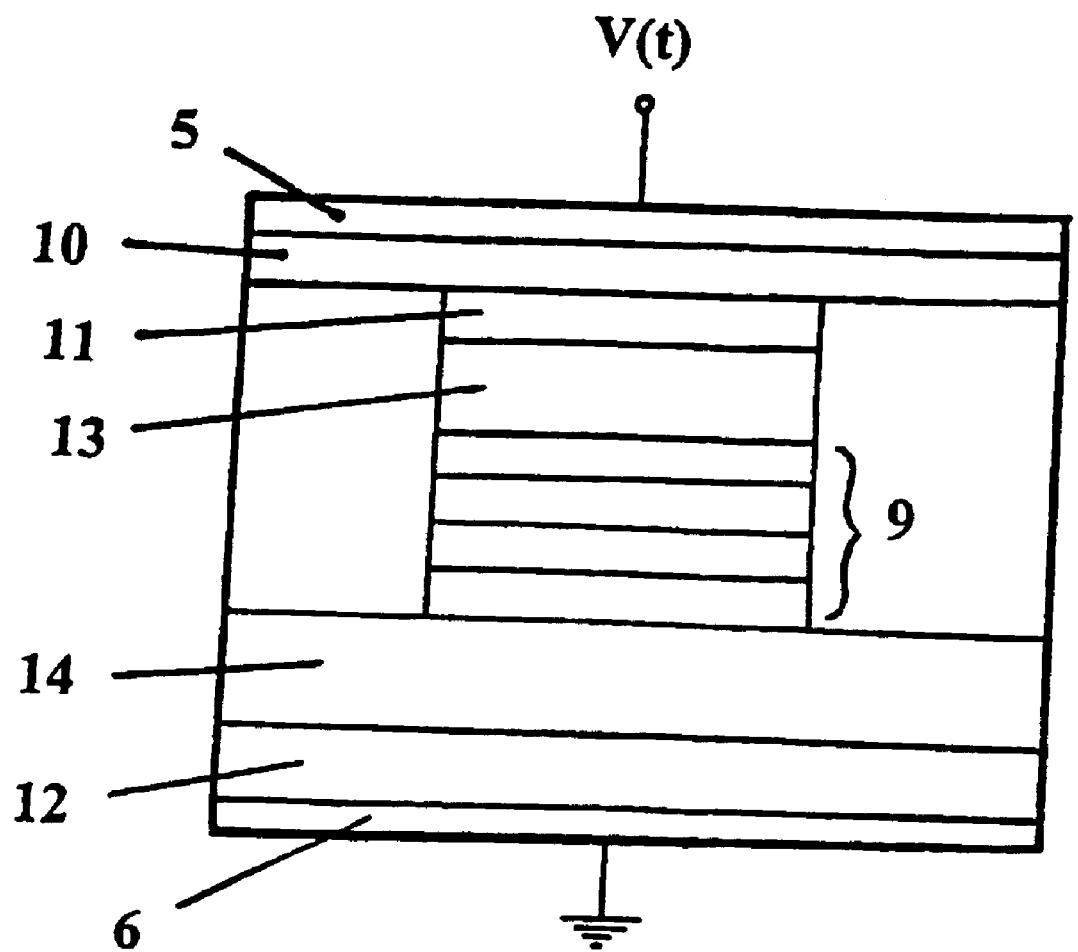

The quantum well layers 9 (FIGS. 1(a), 1(c)) are discretely separated by barrier layers, with waveguide claddings 13, 14 constructed of n and p semiconductors making an n-i-p structure sandwiched between heavily doped p$^+$ and n$^+$ buffer layers 11, 12, respectively. The waveguide patterns, as stated, may be formed by standard photolithography and chemical etching procedures. It is to be noted that the multiquantum wells of portion 9 are only grown in the body portion S (FIG. 1(b)) of the switch in the vicinity of the boundary plane P. Waveguide extensions 1a and 2a extend from body S and are not in quantum well structure, limiting the quantum wells only to the interaction region between waveguides 1a, 2a. Further, monolithically grown integrated circuits, laser diodes or waveguides may be grown directly adjacent to port 1, with ports 2 and 3 coupled to waveguides or light detecting diodes. It is to be further noted that while waveguide 3 is shown and described as being in air ($n_2$), the air may be replaced by another optically transmissive medium of a constant refractive index, such as a liquid or solid. The electrodes 5, 6 (hot, ground respectively) may be formed by Au evaporation on Cr, with a SiO$_2$ insulation layer 10 under the hot electrode 5. With this construction, application of voltage between electrodes 5, 6 develops an electric field in the materials between the electrodes, changing the refractive index of the quantum well layers in portion 9 of switch S by deforming electron wave functions of atoms or molecules of the semiconductor material. Such refractive index changes are much larger than those in bulk materials, and experimentally measured changes of a few percent have been reported in numerous publications (10, 11, 12 and 13). This refractive index change is the basis of switching between the reflection and transmission states of the optical switch of the present invention.

Figure 2:
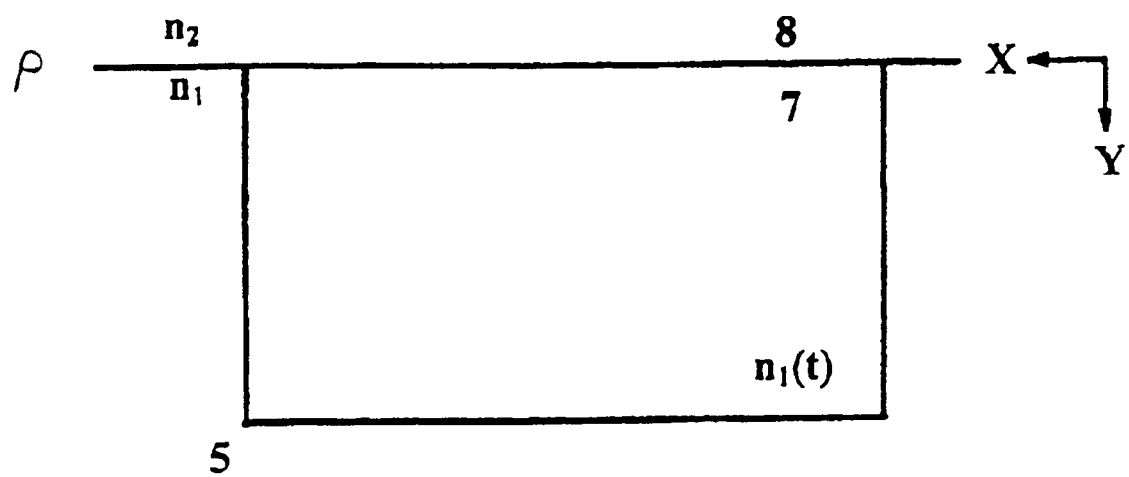
FIG. 2 shows a boundary plane between 2 materials of refractive indices $n_1$ and $n_2$ where $n_1$ is changed as $n_1(t)$ by application of the voltage V(t) to an electrode 5.

As to operation of the switch of the present invention, reference is made to FIG. 2. Here, the boundary plane P between two materials 7, 8 of refractive indices $n_1$ and $n_2$, respectively, are shown, with $n_1$ being that of the electrooptic material. The boundary plane is taken along x of the coordinate system, with $n_2$ kept constant while $n_1$ is varied by voltage application to electrode 5. The refractive index change is manifested as a function of time $n_1(t)$. The reverse situation where $n_2$ is chosen to be an electrooptic material with $n_1$ kept constant, will be explained later herein. As stated, if $n_1$ is a semiconductor material, refractive index changes may take place in time durations shorter than something on the order of 0.1 pico seconds. Also as stated, in case refractive index changes are achieved by carrier injection into semiconductor materials, speeds on the order of about 10 MHz may be realized. The speed further drops to about 100 microseconds if refractive index is changed through heat application to thermooptic materials, and would be in the range of tens of seconds or longer if materials are replaced by an automated mechanical drive or the like. As such, a particular method through which refractive index changes are achieved is immaterial to operational principles of the switch. Further, it should be apparent that in those embodiments of the switch of the instant invention constructed to function with other stimulus, such as heat, the switch S may be constructed of a bulk material without the quantum well structure as described for the semiconductor embodiments. Also, it should be noted that the above-described embodiments are by way of example only, and are not to be construed as limiting the scope of the instant invention.

Figure 3:
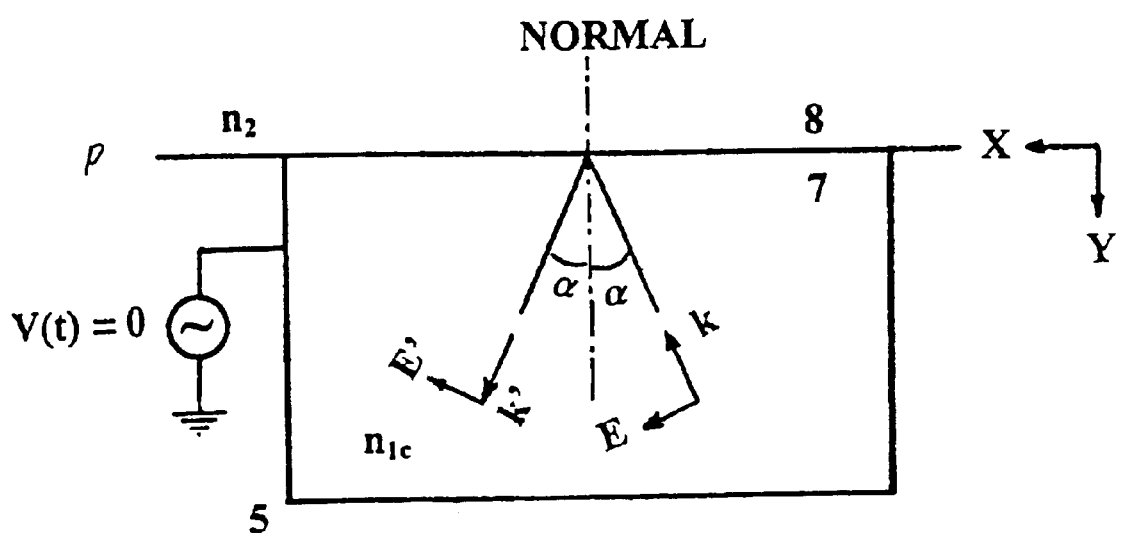
FIG. 3 shows a total reflection state of a switch of the instant invention for an incident transverse magnetic (TM) plane wave with an electric field in an xy plane of the material of refractive index $n_1(t)$ of the switch.
Figure 4:
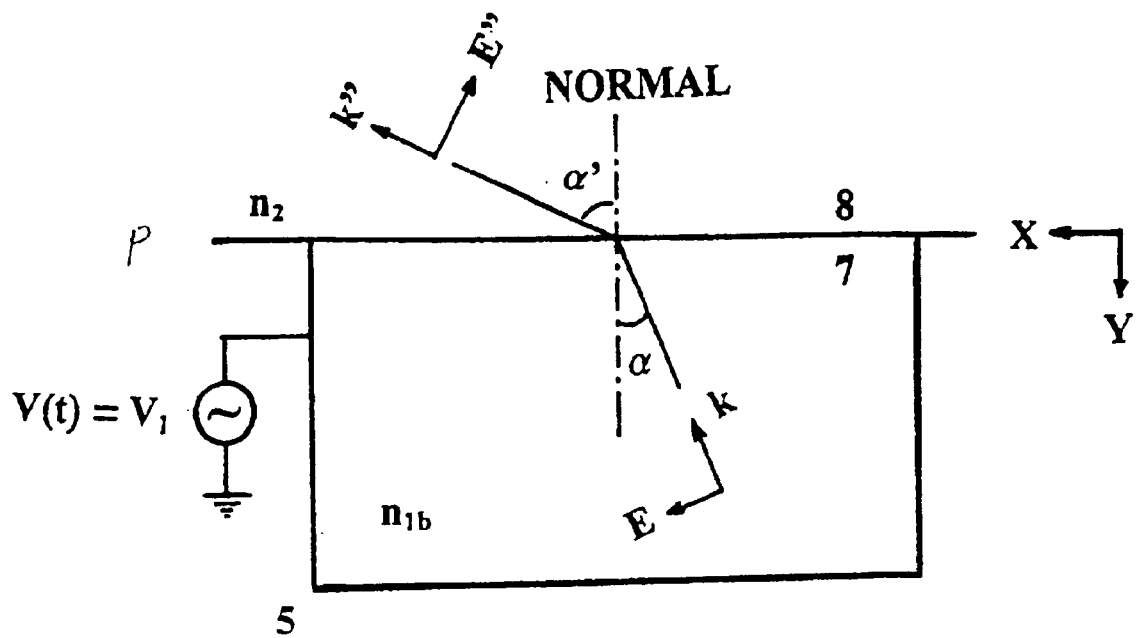
FIG. 4 shows a total transmission state of a switch of the instant invention for the same incident transverse magnetic (TM) plane wave as seen in FIG. 3.

With respect to operation, FIG. 3 shows a reflection state of a switch of the instant invention. While operation of a multi-quantum well semiconductor optical switch is described, it should be apparent that the same principles apply for any embodiment of a switch of the instant invention. Here, a plane wave of propagation vector k is incident on the boundary plane P at an angle α. Polarization of incident light shown by E is taken to be in a plane defined by normal to boundary plane P and propagation vector k (i.e. transverse magnetic (TM) wave). For a given angle of incidence α and refractive index $n_2$ that is held constant, there is always a specific refractive index $n_1(t)$ shown by $n_{1c}$ (with $n_{1c}$ being larger than $n_2$) that results in total internal reflection along propagation vector k'. Then, $n_{1c}$ is required to satisfy $$\alpha = \mathrm{Sin}^{-1}(n_2/n_{1c}) \qquad (1)$$

where α corresponds to the critical angle and subscript c is, therefore, attached to indicate that particular refractive index. This value of $n_{1c}$ can be chosen to correspond to static refractive index of the semiconductor material before application of the voltage (i.e. V(t)=0). Leaving the angle of incidence α intact, the transmission state of the switch is described with reference to FIG. 4. Here, voltage is applied to electrode 5, with the assumption that the refractive index of the electrooptic material 7 (FIG. 1(b)) decreases with increasing voltage. If $n_{1c}$ is decreased to $n_{1b}$ at the applied voltage V(t)=V$_1$ with $n_{1b}$ satisfying $$\alpha = \mathrm{Tan}^{-1}(n_2/n_{1b}), \qquad (2)$$

the incident plane wave will be transmitted to the material of refractive index $n_2$ with propagation vector k''. Under such condition, light is incident on the boundary plane P at the Brewster angle and, therefore, subscript b is attached to $n_1$. This is the transmission state of the switch, which state being perpendicular to the reflection state shown in FIG. 3, i.e. k' is perpendicular to k'', with α' satisfying $$\alpha' = \mathrm{Tan}^{-1}(n_{1b}/n_2). \qquad (3)$$

In this way, forced oscillations of electrons inside the semiconductor material in the xy plane, as a consequence of interaction with incoming light, is used to achieve switching between perpendicular states as described above. Such switching action takes place due to the refractive index change from $n_{1c}$ to $n_{1b}$. As an example, $n_1$ may be a compound GaInAs semiconductor, and possibly having quantum well structures with $n_{1c}$=3.5. If $n_2$ is air, the critical angle is α=16.601 degrees with the switch in its reflection state. If the refractive index is decreased to $n_{1b}$=3.3541, as by application of a voltage between the electrodes as described, the switch changes to its transmission state. The required refractive index change is $\Delta_s$=4.08%, this change being realized by use of quantum well structures in boundary plane P (12, 13). If the compound semiconductor is PbTe with $n_{1c}$=6.2576 at 3.39 μm wavelength, the required refractive index change is $\Delta_s$=1.277% that is easier to achieve. It should be noted here that Applicant's invention, and in view of the foregoing, allows construction of a light switch wherein the light input port and reflection port are relatively close to normal (16.601 degrees for GaInAs and 9.196 degrees for PbTe) with respect to boundary plane P. This allows for a shorter light path through the switch S, and which is contrasted to prior art light switches (FIGS. 8, 9) that use much shallower angles, and thus longer light paths, which in turn degrades switching performance. The long light propagation paths inside the semiconductor material result in high absorption loss, which has remained to be a serious impediment in realization of intersecting waveguide-type optical switches. In the instant invention, the angle of incidence is close to normal to the boundary (16.601 degrees for GaInAs and 9.196 degrees for PbTe semiconductors) resulting in short propagation paths. Therefor, absorption losses of the instant invention are much smaller than those in the prior art intersecting-waveguide switches and the above-mentioned impediment is overcome. In the instant invention, total reflection and transmission at boundary plane P bring about the possibility of 90-degree light deflection at relative refractive index changes of 4.08% in the instance where GaInAs is used, and only 1.277% in the instance where PbTe is used. By way of comparison, a prior art intersecting waveguide (TIR) type optical switch (FIGS. 8, 9) provides less than 16 degrees light deflection at 1.277% refractive index change (2, 3).

Figure 5:
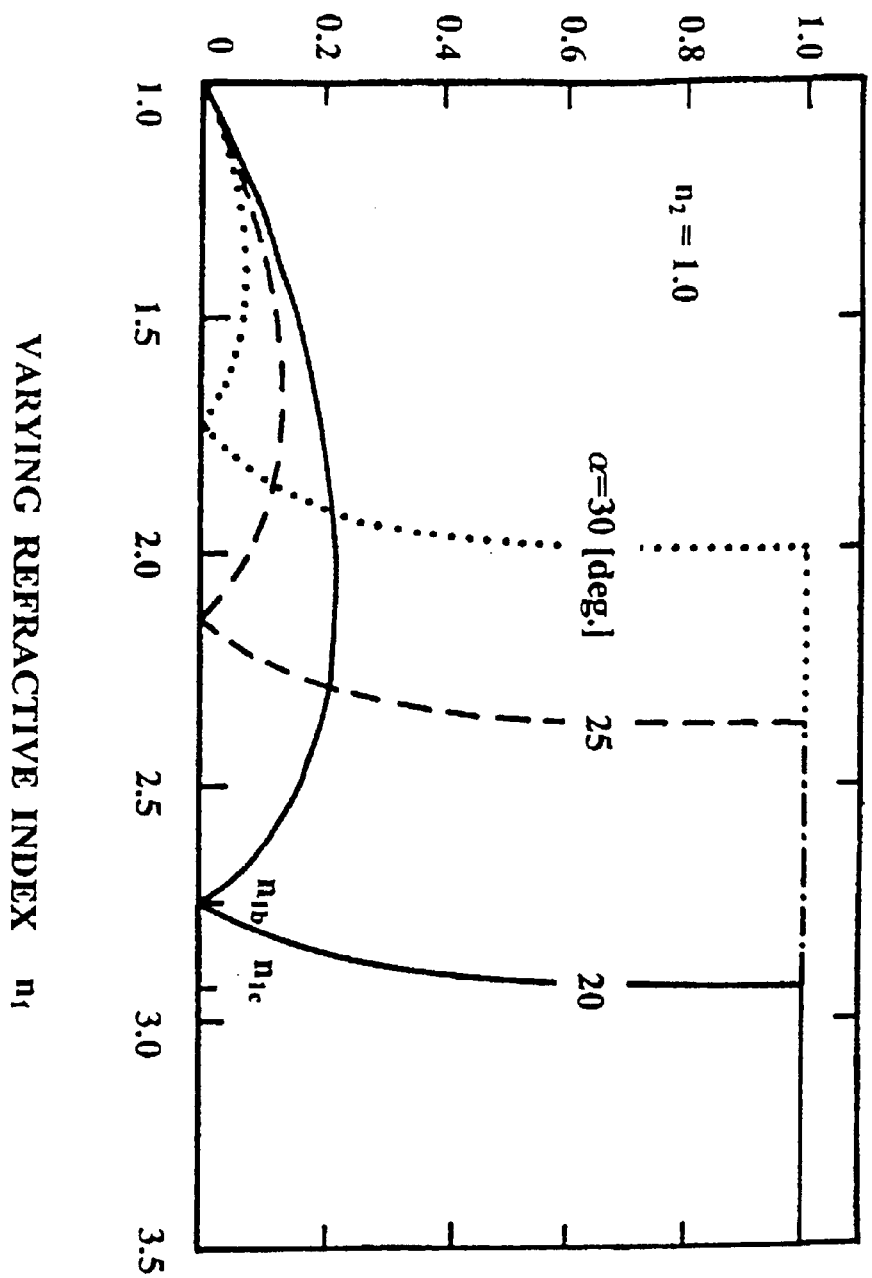
FIG. 5 shows field amplitude reflection coefficient of a transverse magnetic (TM) plane wave $|r_{TM}|$ versus the varying refractive index $n_1$ for various angles of incidence $\alpha$.

Referring now to FIG. 5, the switching mechanism of a switch of the instant invention is illustrated. Here, the field amplitude reflection coefficient of the TM polarization $|r_{TM}|$ is plotted against refractive index $n_1$, with the angle of incidence α as the parameter and $n_2$ (air) taken to remain constant. As seen, the reflection coefficient is rapidly varied from 1.0 to 0.0 when $n_1$ is changed from $n_{1c}$ to $n_{1b}$ (marked only for α=20 degrees). In the instance of transverse electric (TE) polarization where the electric field E is parallel to boundary plane P, i.e. normal to the page in FIGS. 3 and 4, the reflection coefficient does not vanish and, therefor, TE polarization cannot be used in the switch of the instant invention.

Figure 6:
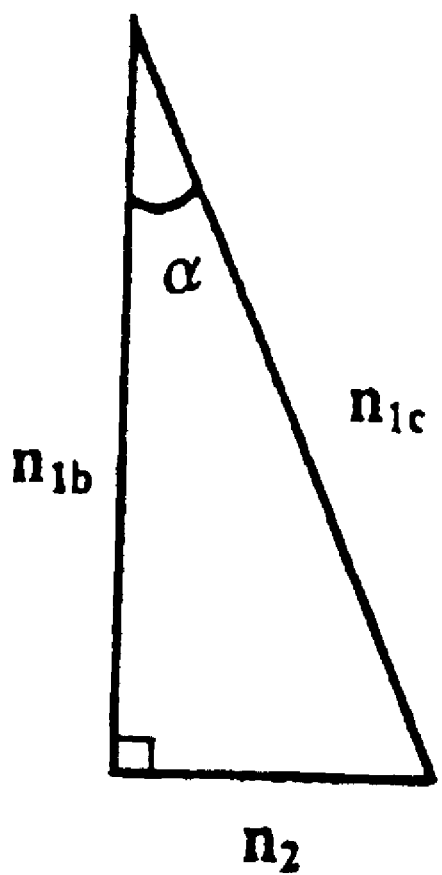
FIG. 6 shows the relation among refractive indices in the form of a right triangle with the vertex angle $\alpha$ as the angle of incidence.

The relationship between refractive indices can be obtained from Equations (1) and (2) that give:

$$n_{1c}^2 = n_{1b}^2 + n_2^2 \qquad (4)$$

and as seen in FIG. 6, these refractive indices represent the sides of a right triangle, with the angle of incidence α as the vertex. Their relationship shows that a difference $n_{1c}-n_{1b}$, achieved by voltage application, can be decreased by reducing angle of incidence α. Following common practice with respect to optical waveguides, relative refractive-index differences are defined as follows: Corresponding to the reflection state shown in FIG. 3, $$\Delta_c = (n_{1c}^2 - n_2^2)/2n_{1c}^2. \qquad (5)$$

Then, the switching relative refractive index difference $\Delta_s$ defined as $$\Delta_s = (n_{1c}^2 - n_{1b}^2)/2n_{1c}^2, \qquad (6)$$

can be expressed in the simple form of $$\Delta_s = (n_2/n_{1c})^2/2. \qquad (7)$$

Figure 7:
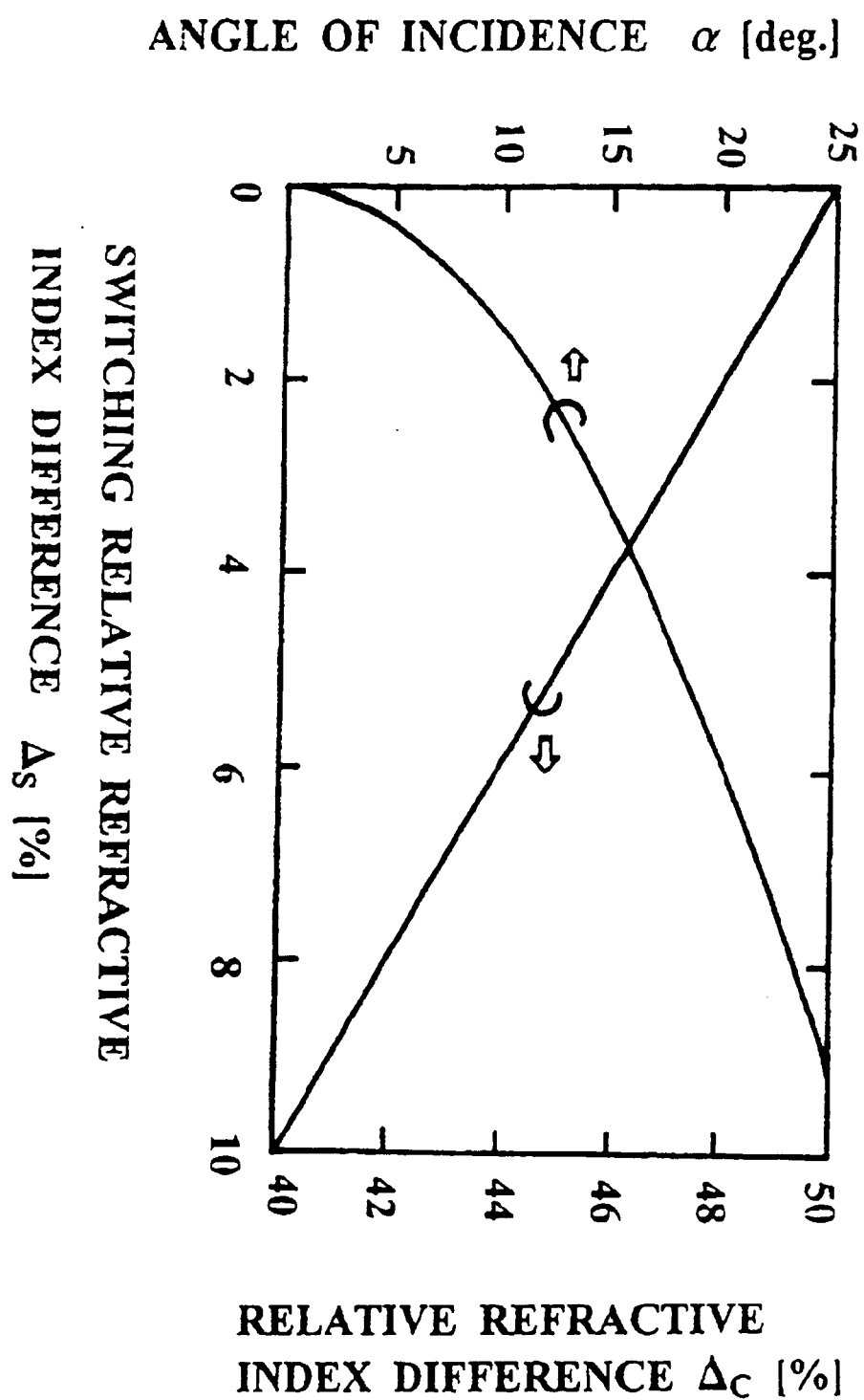
FIG. 7 shows angle of incidence $\alpha$ and relative refractive index difference $\Delta_c$ versus switching relative refractive index difference $\Delta_s$.

Variations of relative refractive index $\Delta_c$ and angle of incidence α with required switching relative refractive index difference $\Delta_s$, are shown in FIG. 7. Here, $\Delta_s$ is reduced once α is decreased, demanding a large $\Delta_c$. Therefore, initial choice of materials of refractive indices $n_{1c}$ and $n_2$ affects switching characteristics drastically. This is why the required switching refractive index difference $\Delta_s$ is decreased from 4.08% in the instance of GaInAs to 1.277% in the instance of PbTe. This offers a great flexibility to switch designers, and enables them to always achieve 90-degree light deflection with required switching relative refractive index difference $\Delta_s$, as determined only by $n_{1c}$ and $n_2$.

So far, the switching operation as described has been achieved for the case where refractive index $n_1$ decreases with increasing applied voltage. In the opposite case where the refractive index $n_1$ of the material increases with increasing voltage, 90 degree light deflection may similarly be achieved. In this instance, boundary plane P has to be an interface of materials 7, 8 of $n_{1b}$ and $n_2$, respectively, resulting in transmission of incident transverse magnetic (TM) light at a Brewster angle. Application of the voltage makes nib to be increased to $n_{1c}$, resulting in total reflection of incoming light.

Figure 8:
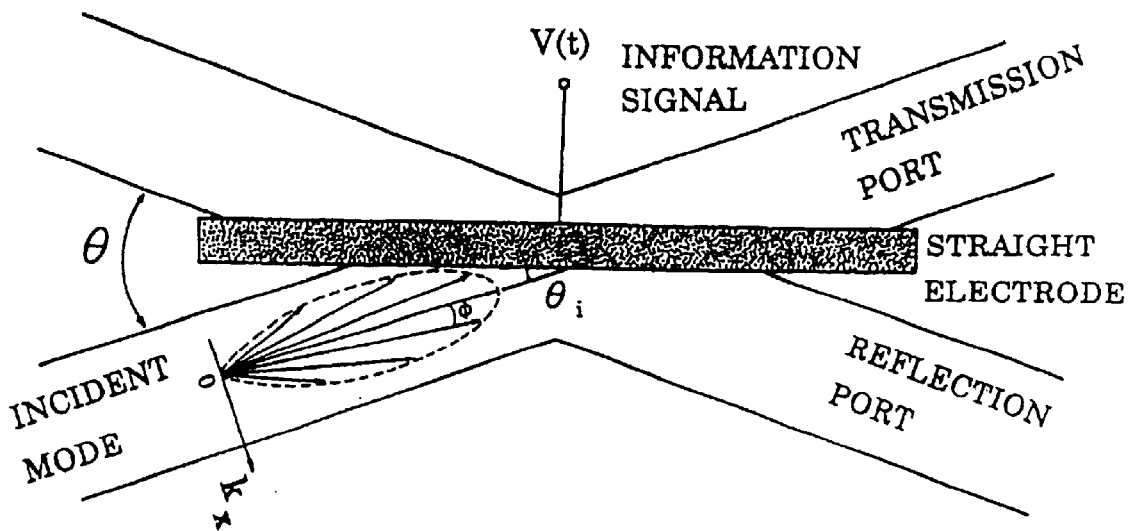
FIG. 8 shows a prior art conventional intersecting waveguide (TIR) type switch with a straight electrode.
Figure 9:
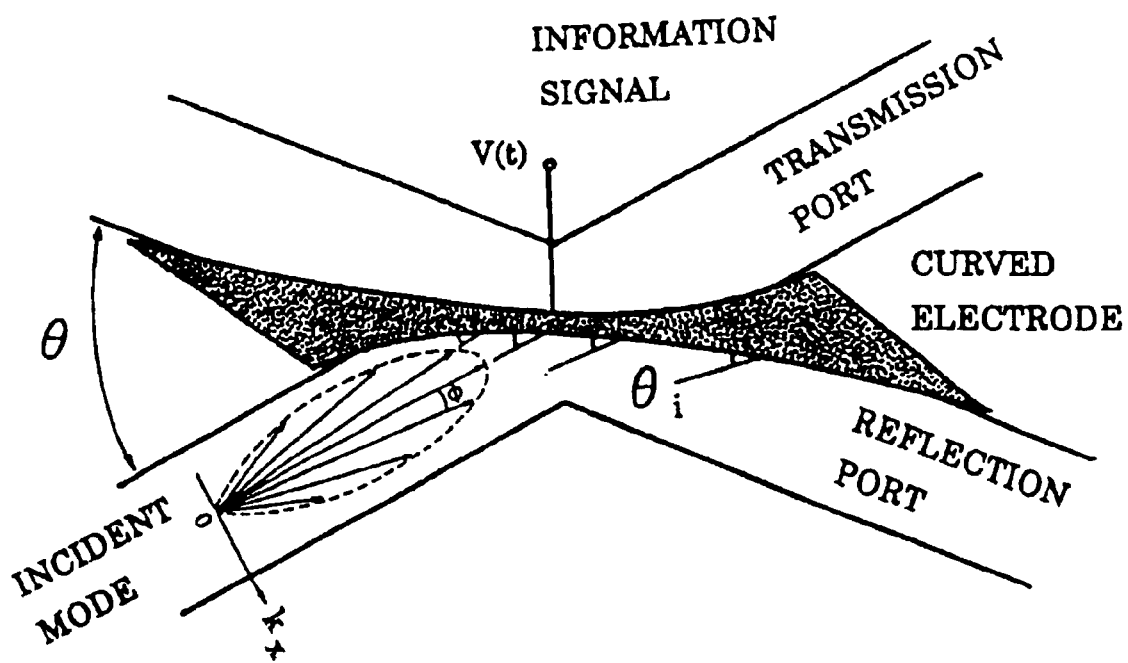
FIG. 9 shows a prior art conventional intersecting waveguide (TIR) type switch with a curved electrode.

In the instant invention, deflection angle between switched states is not determined by refractive index change caused by voltage application, as is the case for a prior art intersecting waveguide (TIR type) switch as shown in FIG. 8. In this prior art switch, intersection angle θ, according to an overestimation based on ray optics, is twice the critical complementary angle. For example, at a refractive index change of 4% corresponding to a critical angle of 73.6 degrees, the intersection angle is 32.8 degrees. However, a detailed wave approach has indicated that an actual intersection angle is much smaller (3). To overcome this limitation, an exponentially curved electrode was proposed and patented, which electrode improving characteristic performance of such prior art switches as shown in FIG. 9 (4, 6). However, even in these improved switches, the intersection angle is limited by magnitude of refractive index change. In this respect, the present invention relaxes such limitation and brings about the possibility of 90 degree light deflection.

The optical spatial switch presented so far is hereinafter designated "main switch", and is to be distinguished from the "dual switch" described in the following paragraph. Here, the "main switch" is taken to be a switch wherein incident light initially impinges on the switching medium of a variable refractive index and after which, with the switch in a transmission state, may pass through boundary plane P into a second medium wherein the refractive index is held constant (air). In a dual optical switch, incident light initially passes through the medium of a constant refractive index, and then passes through the medium of a variable refractive index. A dual switch may be constructed as shown in FIG. 1(b) by simply replacing medium 8 with a variable refractive index material as described and fabricating body portion S of the switch of a material 7 of constant refractive index, also as described. Of course, the boundary plane P for both portions of media 8 and 7 is provided with the same exponential spiral curvature.

As shown in FIGS. 1(a), 1(b), 1(c), 2, 3 and 4, switching takes place because in the main switch, refractive index changes from $n_{1c}$ to $n_{1b}$, with $n_2$ kept constant. In the dual switch, switching can also take place if $n_1$ is kept constant and $n_2$ is changed from $n_{2c}$ to $n_{2b}$ where again, subscripts c and b refer to critical and Brewster angles. This results in reflection and transmission states, respectively, which are referred to as the "dual switch". Following an analogous approach, it can be shown that, in the dual switch, refractive indices are related as:

$$n_{2c} = n_1 n_{2b}/(n_1^2 + n_{2b}^2)^{1/2} \qquad (8)$$

and the two states of total reflection and transmission are, again, at right angles. A main feature of this dual switch is that incoming light travels in a medium of constant refractive index $n_1$. The light is made to be totally reflected or transmitted by changing $n_{2c}$ to $n_{2b}$ of the medium following the $n_1$ medium. This feature is an advantage in certain applications where improved dynamic switching characteristics are required. However, the requirement that $n_1$ be larger than $n_{2c}$ negates a possibility of very fast operation because rapid refractive index changes have been developed only in quantum well semiconductors with response times shorter than 0.1 pico seconds. These quantum well semiconductors have large refractive indices, about 3.5 for GaInAs, and even larger for Ge, Si and PbTe. In the case of optical quality materials of smaller refractive index (e.g. $LiNbO_3$, glass, polymers, etc.), methods of field application, thermooptic effect, current injection or material replacement may be used in achieving refractive index changes in the dual switch. However, such methods may not result in adequate refractive index changes and do not achieve desired switching speeds on the order of 100 Gb/sec as with the main switch. Therefore, low speed operation of a dual switch is due to material limitations and not its switching mechanism. Such dual switches may be used in lower speed applications where incident light is required to travel in a static medium free from dynamically induced disturbances. In the following Table 1, some examples of suitable materials and specifications of the main and dual switches are listed.

TABLE 1

Specifications of typical main and dual switches

| | | | $\Delta_s$ [%] | α [deg.] | α'[deg.] |
|---|---|---|---|---|---|
| MAIN SWITCH | | | | | |
| $n_{1c}$ | $n_{1b}$ | $n_2$ | | | |
| 3.5 (GaInAs) MQW | 3.3541 | 1.0 (Air) | 4.08 | 16.601 | 73.399 |
| 3.4757 (Si) MQW | 3.3287 | 1.0 (Air) | 4.14 | 16.721 | 73.279 |
| 6.2576 (PbTe) MQW | 6.1772 | 1.0 (Air) | 1.277 | 9.196 | 80.804 |
| DUAL SWITCH | | | | | |
| $n_1$ | $n_{2c}$ | $n_{2b}$ | | | |
| 1.5 (Glass) | 1.0 (Air) | 1.3416 (Liquids) | 22.22 | 41.81 | 48.29 |
| 2.2536 (Ti:$LiNbO_3$) | 1.5 (Glass) | 2.0099 (AgCl) | 22.15 | 41.728 | 48.272 |

MQW: Multiquantum Well

As seen, in the case of the main switch, very high speed operation is possible by voltage application to quantum well semiconductors to achieve the required switching refractive index change $\Delta_s$. For the dual switch, many materials, such as $LiNbO_3$, glass and liquid materials may be used in realization of the device, if they are replaced mechanically. In these embodiments, the change of refractive index is achieved by mechanical replacement of the material of the switch.

Figure 10:
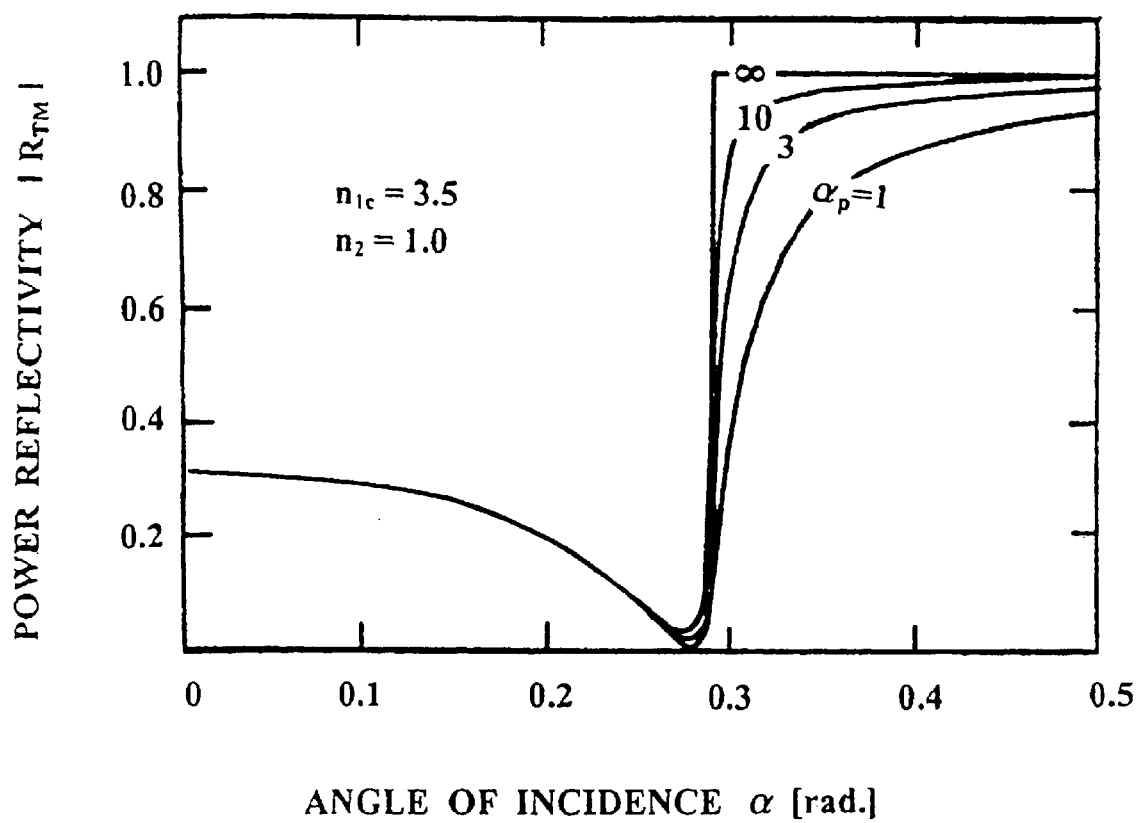
FIG. 10 shows power reflectivity of a transverse magnetic (TM) plane wave $|R_{TM}|$ versus an angle of incidence $\alpha$ with index-loss variation ratio $\alpha_p$ as the parameter.

The degradation effects of absorption losses on switching characteristics of the main switch are described with reference to FIG. 10. Absolute value of power reflectivity of the TM mode $|R_{TM}|$ is plotted against angle of incidence α with index-loss variation ratio $\alpha_p$ defined as the quotient of real to imaginary parts of refractive index changes, as parameter (14).

Figure 11A:
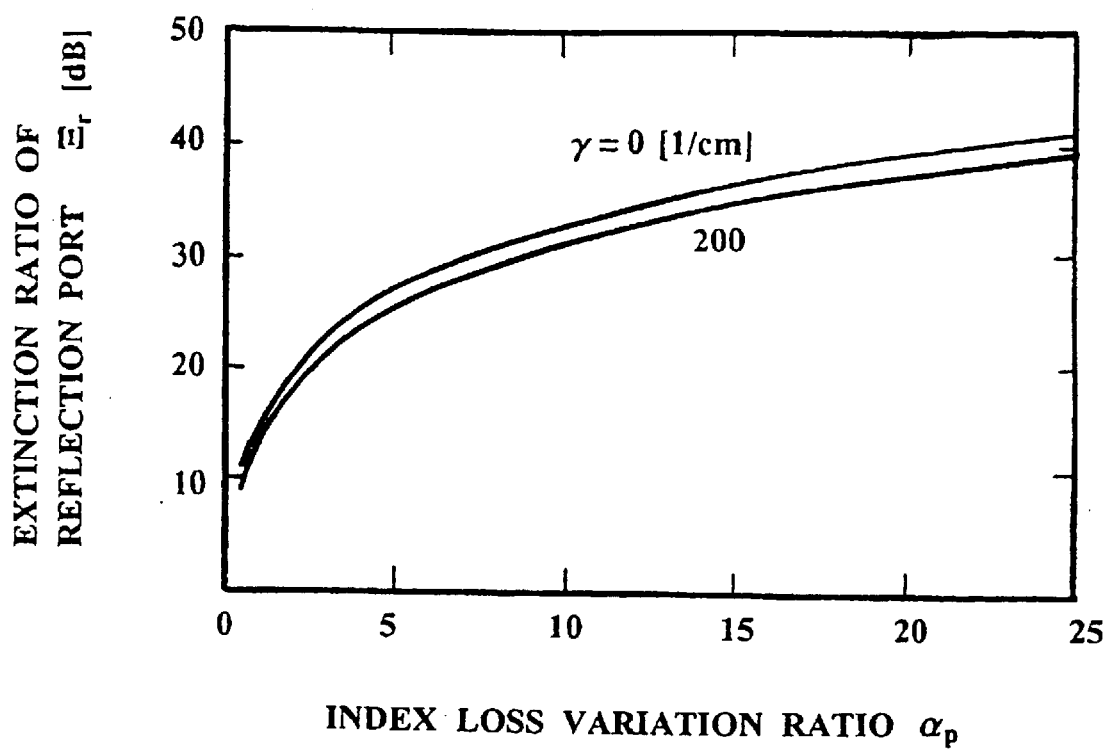
FIG. 11($a$) shows an extinction ratio of a reflection state $\Xi_r$ of a switch of the present invention versus index-loss variation ratio $\alpha_p$ and a fundamental absorption coefficient $\gamma$ as the parameter.
Figure 11B:
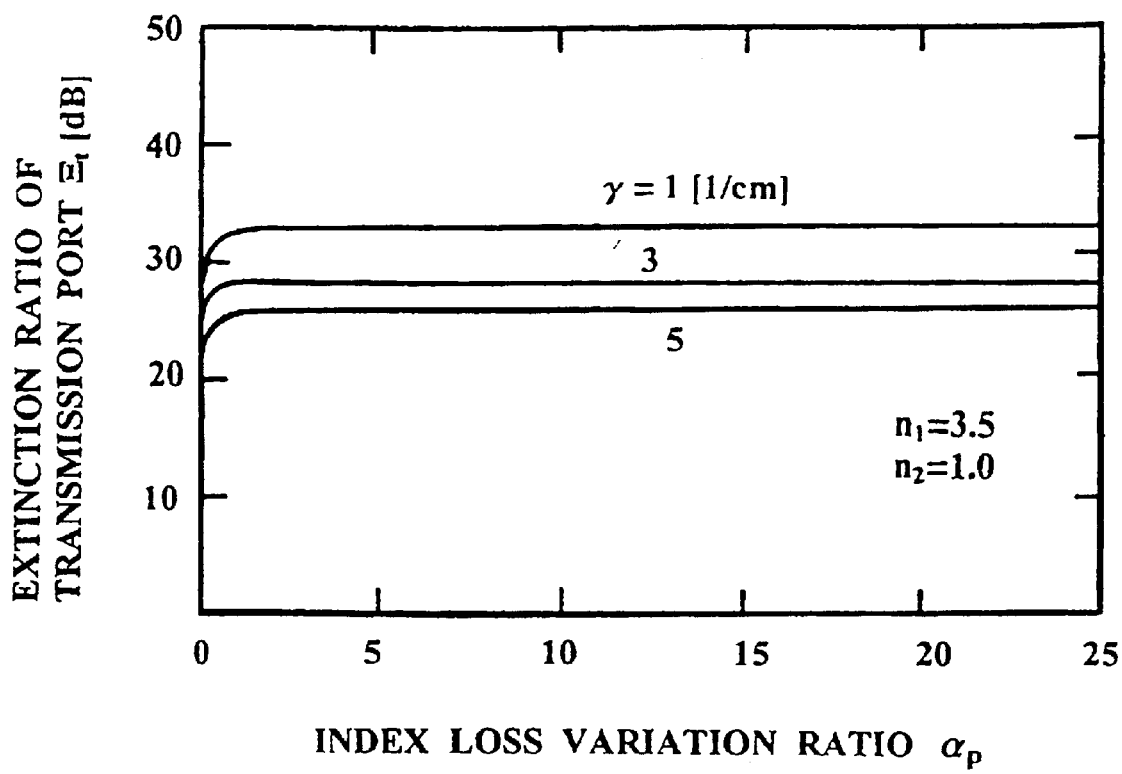

At no absorption loss of $\alpha_p = \infty$, there is a sharp transition from the total reflection inside the critical angle to no reflection at the Brewster angle. This indicates perfect light switching between the two states, resulting in very large extinction ratios. As absorption losses are increased, the transition becomes smooth, and total reflection and transmission both cease to exist, resulting in deterioration of extinction ratios. In prior art intersecting waveguide (TIR) type switches of FIG. 8, light leakage between the two states causes large extinction ratios to not be achievable. In the instant invention, it is possible to achieve large extinction ratios even in the presence of moderate absorption losses due to well isolated transmission/reflection states. This situation is described in FIGS. 11(a) and (b), where extinction ratios of reflection and transmission states are plotted against the index-loss variation ratio $\alpha_p$ and the fundamental absorption loss coefficient ɣ as the parameter.

Figure 12:
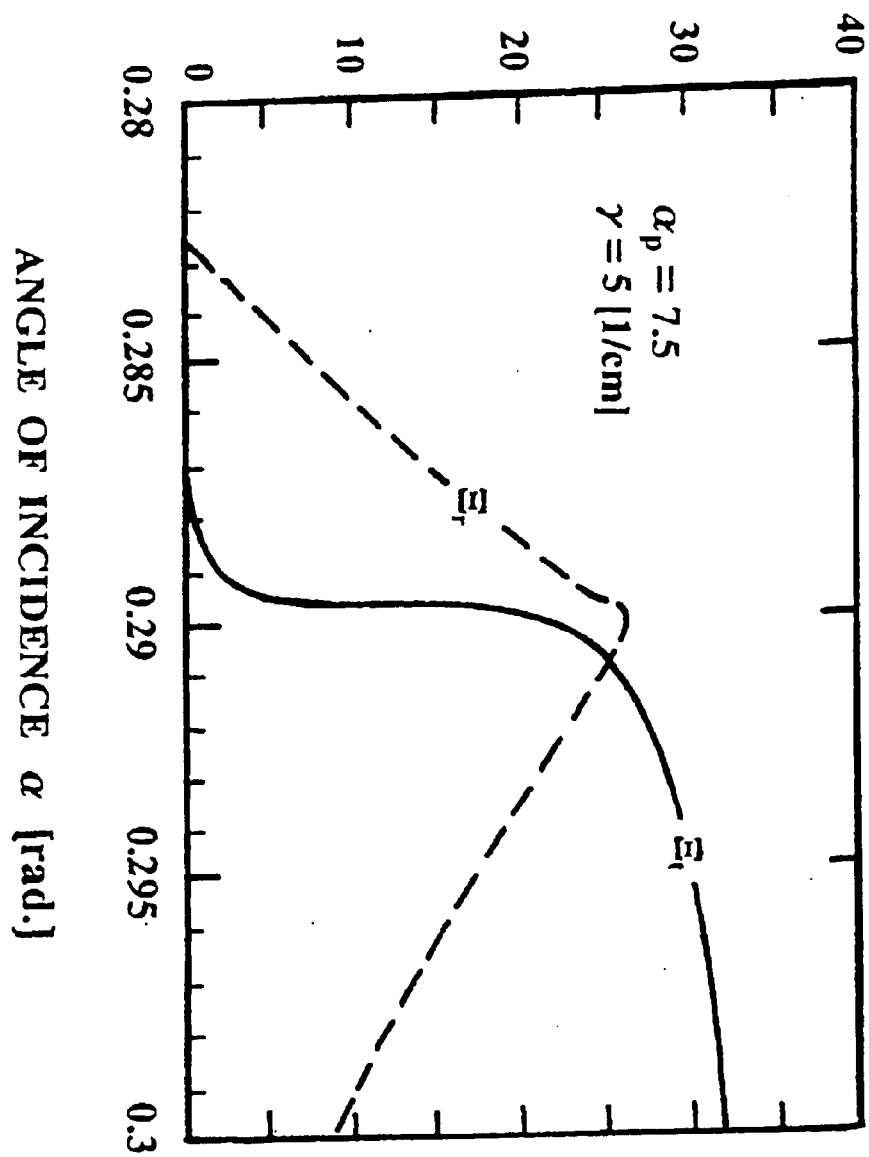
FIG. 12 shows extinction ratios of reflection and transmission states versus angle of incidence $\alpha$.

As shown in these Figures, the extinction ratios of both states remain above 25 dB even in the presence of moderate absorption losses of $\alpha_p = 5$ and ɣ=5 cm$^{-1}$ in the quantum-well semiconductors. In the case of low speed switching where low absorption loss materials may be employed, the present invention allows much higher extinction ratios because of well isolated states. In the presence of such high absorption losses, the critical and Brewster angles are shifted slightly and the angle of incidence α must be adjusted accordingly. The required shift is shown in FIG. 12 where the extinction ratios of both ports are plotted against the angle of incidence α. As seen, the extinction ratios are very sensitive and the angle of incidence must be accurately adjusted.

Although switching has been achieved to date for plane waves, capability of the present invention may be extended to encompass guided modes. Here, boundary plane P (FIG. 2) between materials 7, 8 of refractive index $n_1$ and $n_2$, respectively, is curved in the form of an exponential spiral given by:

$$\rho(\phi) = \rho_0 \exp[-C\phi] \quad (9)$$

where ρ, φ represent radius and angle of the circular coordinates, respectively, and $\rho_0$ is a constant. C is determined by the condition of total reflection, and is adjusted such that curved boundary plane P poses a constant angle of incidence to all variously oriented plane wave components of the guided mode calculated as follows. The guided mode is expressed as:

$$E(x,y,z) = A\, F_r(x)\, \exp[j(\omega t - \beta z)] \quad (10)$$

where $F_r(x)$ shows the transverse field distribution, ω and β stand for the radian frequency and the propagation constant, respectively. $F_r(x)$ is given by:

$$F_r(x) = \cos \zeta x \ldots |x| \text{ inside waveguide core of width a} = \exp[\sigma(a/2 - |x|)]\cos(\zeta a/2) \ldots |x| \text{ outside waveguide core of width a.} \quad (11)$$

Figure 13:
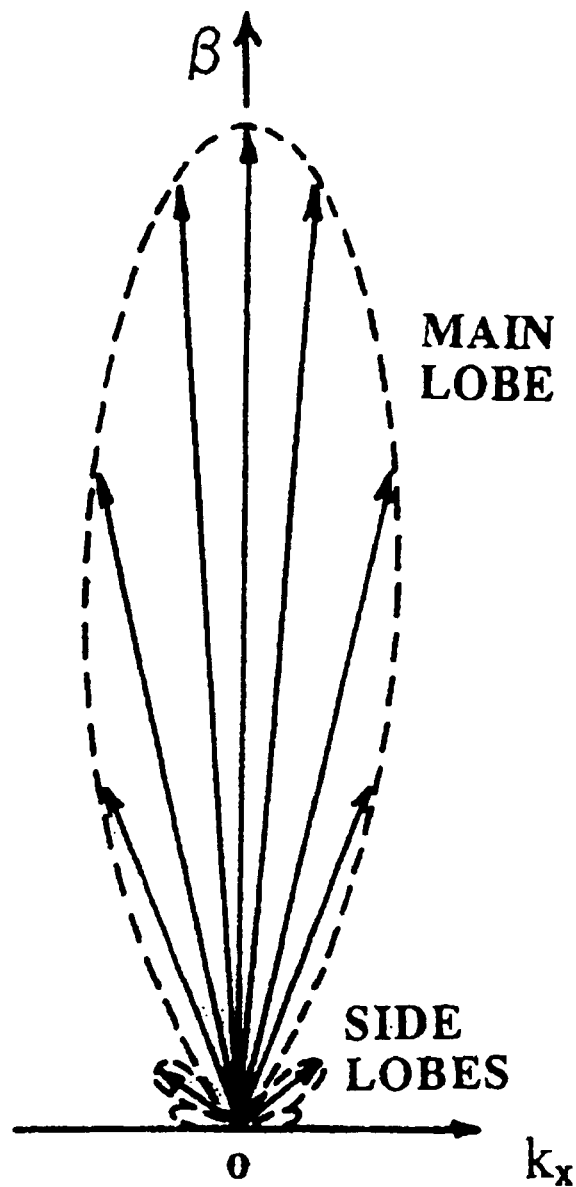
FIG. 13 shows a plane wave representation of a guided mode in a plane of propagation constant $\beta$ and transverse wave number $k_x$.
Figure 14:
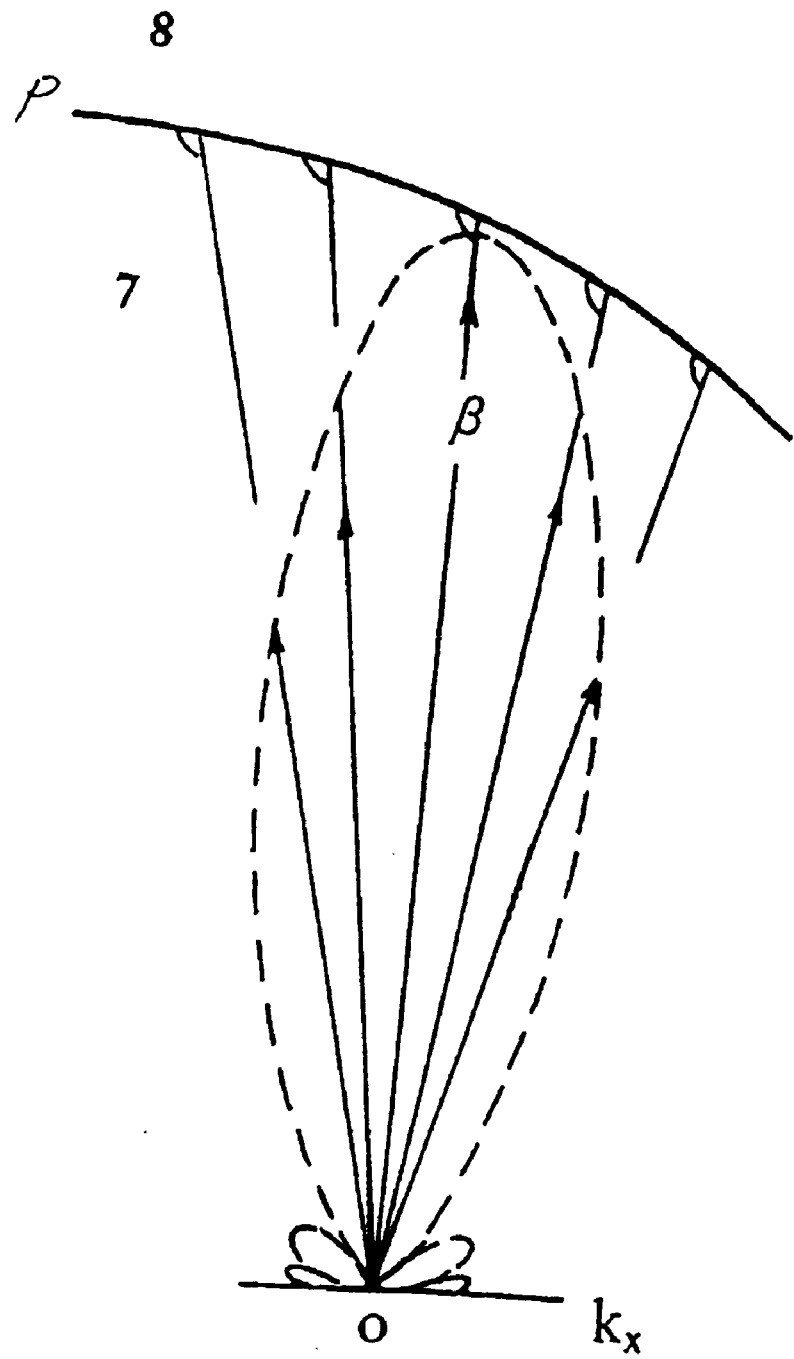
FIG. 14 shows an exponentially curved boundary plane posing a constant angle of incidence $\alpha$ to all variously oriented plane wave components of the guided incident mode of FIG. 13.

$F_r(x)$ is Fourier transformed to express it as a continuum of plane waves shown in FIG. 13 in the plane of propagation constant β and wave number $k_x$ (6). Once such a continuum of plane waves is incident on the curved boundary plane P as given by Equation (9), the angles of incidence of all components are equalized as shown in FIG. 14. Therefore, the guided mode in reflection or transmission at an exponentially curved boundary behaves as a plane wave in reflection or transmission at a straight interface (15). In this way, the switch of the present invention is enabled to handle guided modes as well as plane waves.

Having thus described how my invention is constructed and the manner of its use, it should be apparent to those skilled in the art that incidental changes may be made thereto that fairly fall within the scope of the following appended claims, wherein I claim:

1. An optical spatial switch comprising:
   a first medium and a second medium each of differing refractive index, with one of said first medium and said second medium of a constant refractive index and the other of said first medium and said second medium of a selectively variable refractive index,
   a single boundary plane between said first medium and said second medium, said boundary plane configured as an exponential spiral,
   a first optical waveguide being a light input port,
   a second optical waveguide and a third optical waveguide, said second optical waveguide and said third optical waveguide selectively receiving light from said first optical waveguide either from said boundary in a reflection state of operation or through said boundary in a transmission state of operation, respectively.

2. An optical spatial switch as set forth in claim 1 wherein light impinging on said boundary from said first optical waveguide is relatively close to normal with respect to said boundary, creating a relatively short light path through said optical spatial switch, resulting in low absorption losses in said optical spatial switch.

3. An optical spatial switch as set forth in claim 2 wherein an angle of incidence with respect to normal to said boundary plane is determined by $\alpha = \sin^{-1}(n_2/n_{1c})$, reducing propagation distances within the semiconductor material, resulting in greatly reduced absorption losses as compared to prior art intersecting waveguide-type optical switches.

4. An optical spatial switch as set forth in claim 1 wherein said exponential spiral of said boundary plane is configured so that, in said reflection state of operation, substantially all light incident on said boundary plane from said first waveguide is reflected into said second waveguide.

5. An optical spatial switch as set forth in claim 1 wherein said exponential spiral of said boundary plane is configured so that, in said transmission state of operation, substantially all light incident on said boundary plane from said first waveguide is transmitted into said third waveguide along a direction determined by $\alpha' = \tan^{-1}(n_{1b}/n_2)$.

6. An optical spatial switch as set forth in claim 1 wherein said boundary is incorporated in two separate media that are replaced mechanically to effect switching between said transmission state of operation and said reflection state of operation.

7. An optical spatial switch as set forth in claim 1 wherein transmitted light of said transmission state of operation and reflected light of said reflection state of operation are close to or at 90 degrees.

8. An optical spatial switch as set forth in claim 1 wherein said medium of a selectively variable refractive index is configured having said boundary plane thereon.

9. An optical spatial switch as set forth in claim 8 wherein said first optical waveguide and said second optical waveguide are in communicating relation with said medium of a selectively variable refractive index.

10. An optical spatial switch as set forth in claim 9 wherein said first optical waveguide and said second optical waveguide are inclined generally at a critical angle with respect to a line normal to said curved boundary, with said second optical waveguide selectively receiving light from said first optical waveguide in said reflection state of operation.

11. An optical spatial switch as set forth in claim 10 wherein said third optical waveguide is oriented with its axis generally along a Brewster angle in said medium of constant refractive index with respect to a line normal to said curved boundary, with said third optical waveguide selectively receiving light from said first optical waveguide in said transmission state of operation.

12. An optical spatial switch as set forth in claim 10 wherein said medium is a heat-sensitive material responsive to applied heat so that light applied to said first optical waveguide is switched between said second optical waveguide and said third optical waveguide responsive to presence or absence of said applied heat.

13. An optical spatial switch as set forth in claim 8 wherein said medium of a selectively variable refractive index is a semiconductor material responsive to an applied electric field so that light applied to said first optical waveguide is switched between said second optical waveguide and said third optical waveguide responsive to presence or absence of said applied electric field.

14. An optical spatial switch as set forth in claim 13 further comprising a pair of electrodes on said optical spatial switch across which said electric field is applied to said semiconductor material, said electrodes conforming to said exponential spiral so that said electric field is uniform throughout said semiconductor material.

15. An optical spatial switch as set forth in claim 13 wherein said medium is a semiconductor material responsive to current injection so that light applied to said first optical waveguide is switched between said second optical waveguide and said third optical waveguide responsive to presence or absence of said current injection.

16. An optical spatial switch as set forth in claim 13 wherein said semiconductor material of said medium is configured having a plurality of multiquantum wells separated by barrier material.

17. An optical spatial switch comprising:
    a body including a boundary plane incorporating an exponential spiral, said body being of an optical medium variable in refractive index,
    a first waveguide facing said boundary plane through said body and serving as a light input port to said body,
    a second waveguide facing said boundary plane through said body and serving as a port of reflection from said body, said first waveguide and said second waveguide each oriented very close to or at a critical angle with respect to said boundary,
    a third waveguide having an axis and positioned across said boundary with respect to said first waveguide and said second waveguide, said third waveguide oriented so that said axis of said third waveguide is generally along a Brewster angle.

18. An optical spatial switch as set forth in claim 17 wherein said optical medium of said body comprises semiconductor multiquantum wells having a refractive index that changes when a voltage is applied thereacross.

19. An optical spatial switch as set forth in claim 17 wherein said second waveguide and said third waveguide are at or very close to 90 degrees, thus making the two reflection and transmission states of the said optical spatial switch mutually perpendicular.

20. An optical spatial switch as set forth in claim 17 wherein said exponential spiral of said boundary plane is configured so that an angle of incidence of all plane wave components of a guided mode of said first waveguide are equalized and set at a critical or Brewster angle and the incident guided mode is substantially completely reflected or transmitted, respectively, to said second waveguide.

* * * * *